United States Patent [19]

Nakajima

[11] Patent Number: 5,269,012
[45] Date of Patent: Dec. 7, 1993

[54] STACK MEMORY SYSTEM INCLUDING AN ADDRESS BUFFER FOR GENERATING A CHANGED ADDRESS BY INVERTING AN ADDRESS BIT

[75] Inventor: Masaitsu Nakajima, Osaka, Japan

[73] Assignee: Matsushita Electric Industrial Co., Ltd., Osaka, Japan

[21] Appl. No.: 618,861

[22] Filed: Nov. 28, 1990

[30] Foreign Application Priority Data

Dec. 8, 1989 [JP] Japan ................................. 1-319857

[51] Int. Cl.$^5$ ............................................. G06F 12/02
[52] U.S. Cl. .................................... 395/425; 395/400; 364/DIG. 1; 364/260.5; 364/254.5
[58] Field of Search ........................ 395/400, 425; 364/200 MS File, 900 MS File

[56] References Cited

U.S. PATENT DOCUMENTS

4,905,201 2/1990 Ohira et al. .............. 365/230.03
5,023,828 6/1991 Grundmann et al. ............ 395/375

Primary Examiner—Joseph L. Dixon
Assistant Examiner—Hiep T. Nguyen
Attorney, Agent, or Firm—Lowe, Price, LeBlanc & Becker

[57] ABSTRACT

A stack memory includes an address input section, a memory element array, a stack pointer, and an address buffer. The address input section has "n" bits where "n" denotes a predetermined number. The memory element array has $2^n$ words and is connected to the address input section. The stack pointer generates a first address signal having "n" bits, and an n-th bit of the first address signal is inverted by a control signal. The address buffer is connected between the stack pointer and the address input section. The address buffer generates a second address signal from the first address signal and outputs the second address signal to the address input section. The second address signal remains equal to the first address signal in bits except an n-th bit, and the n-th bit of the first address signal is inverted again by the control signal to be converted into the n-th bit of the second address signal.

7 Claims, 5 Drawing Sheets

STACK MEMORY SYSTEM INCLUDING AN ADDRESS BUFFER FOR GENERATING A CHANGED ADDRESS BY INVERTING AN ADDRESS BIT

BACKGROUND OF THE INVENTION

This invention relates to a stack memory usable in various devices such as microprocessors.

Some microprocessors include stack memories generally operating as LIFO (Last In Fast Out) memories. As will be explained later, a prior art stack memory has the problem that movement of data therein takes a considerable length of time. When a stack memory is used in a microprocessor, such a long time of data movement causes a decrease in the speed of operation of the microprocessor.

SUMMARY OF THE INVENTION

It is an object of this invention to provide an improved stack memory.

A first aspect of this invention provides a stack memory comprising an address input section having "n" bits where "n" denotes a predetermined number; a memory element array having $2^n$ words and being connected to the address input section; a stack pointer generating a first address signal having "n" bits, wherein an n-th bit of the first address signal is inverted by a control signal; and an address buffer connected between the stack pointer and the address input section, the address buffer generating a second address signal from the first address signal and outputting the second address signal to the address input section, wherein the second address signal remains equal to the first address signal in bits except an n-th bit, and the n-th bit of the first address signal is inverted again by the control signal to be converted into the n-th bit of the second address signal.

A second aspect of this invention provides a stack memory comprising a memory element array having a plurality of words; means for generating a first address signal; means for generating a second address signal from the first address signal; means for allowing an access to one of the words of the memory element array in response to the second address signal; means for changing the first address signal in response to a control signal; and means responsive to the control signal for keeping the second address signal unchanged in dependent of the changing of the first address signal.

A third aspect of this invention provides a stack memory comprising a memory element array having a plurality of words; means for generating a first address signal; means for generating a second address signal from the first address signal; means for allowing an access to one of the words of the memory element array in response to the second address signal; means for equalizing the first address signal and the second address signal in the absence of an active control signal; means for changing the first address signal in response to the active control signal; and means responsive to the active control signal for keeping the second address signal unchanged in dependent of the changing of the first address signal.

DESCRIPTION OF THE PRIOR ART

Figure 1:
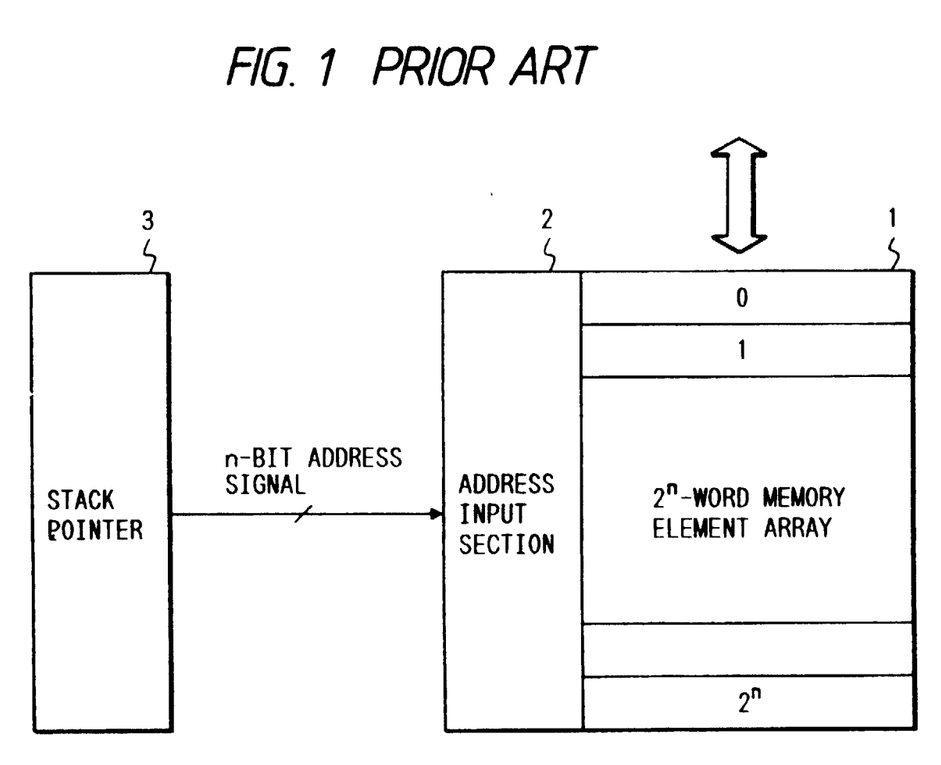
FIG. 1 is a block diagram of a prior art stack memory.

With reference to FIG. 1, a prior art stack memory includes a memory element array 1 having a capacity of $2^n$ words where "n" denotes a given integer. The memory element array 1 is divided into segments called words. An address input section 2 is connected to the memory element array 1. The address input section 2 receives an n-bit address signal from a stack pointer 3. The address input section 2 allows the access to one of the words of the memory element array 1 which is designated by the address signal.

The description will be given of the operation of the prior art stack memory of FIG. 1 in the case where the memory element array 1 has eight words and the stack pointer 3 has three bits.

Figure 2:
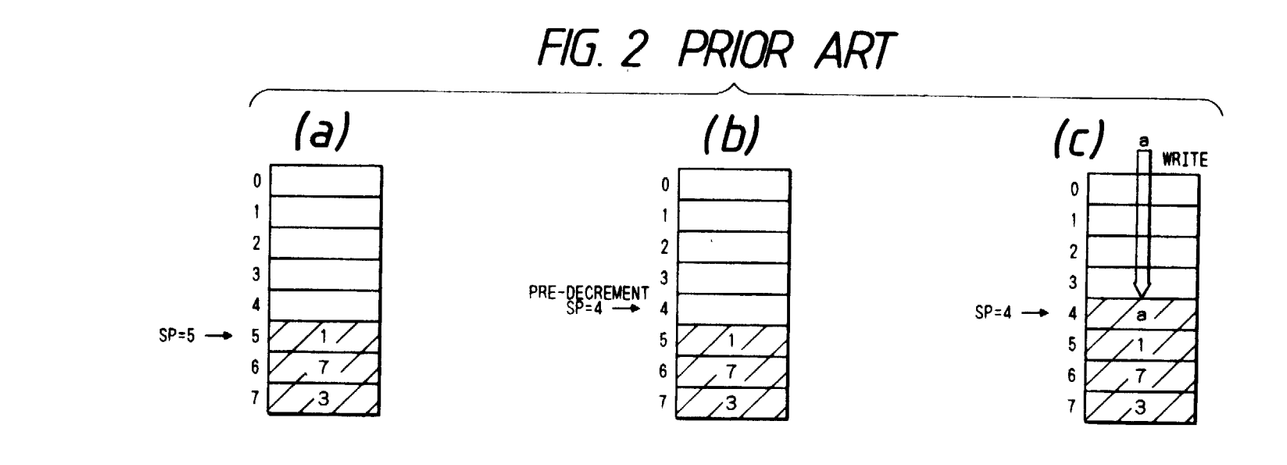
FIGS. 2a-2c, 3a-3c, 4a-4c, and 5a-5c are diagrams showing the relation among the stack pointer signal, the data in the memory element array, and the words of the memory element array in the prior art stack memory of FIG. 1.

Firstly, "push" operation of the prior art stack memory will be explained with reference to FIG. 2. "Push" operation is a process of writing data into the memory element array 1. In FIG. 2, the character SP denotes the state of the stack pointer 3 which indicates the address of the first of words holding data in the memory element array 1. It is now assumed that, as shown in the part (a) of FIG. 2, the current state of the stack pointer 3 is "5". This state of the stack pointer 3 represents that data are stored in the words of the memory element array 1 which have addresses from "5" to "7". To push or write additional data into the memory element array 1, the state of the stack pointer 3 is pre-decremented to "4" as shown in the part (b) of FIG. 2. The pre-decrement is executed by a signal fed to the stack pointer 3 from a controller (not shown). The stack pointer 3 generates an address signal in response to the state "4", the address signal designating the word of the memory element array 1 which has an address of "4". The address signal is fed to the address input section 2, enabling the access to the "4"-address word of the memory element array 1 and thus allowing the additional data "a" to be written into the "4"-address word as shown in the part (c) of FIG. 2.

Figure 3:
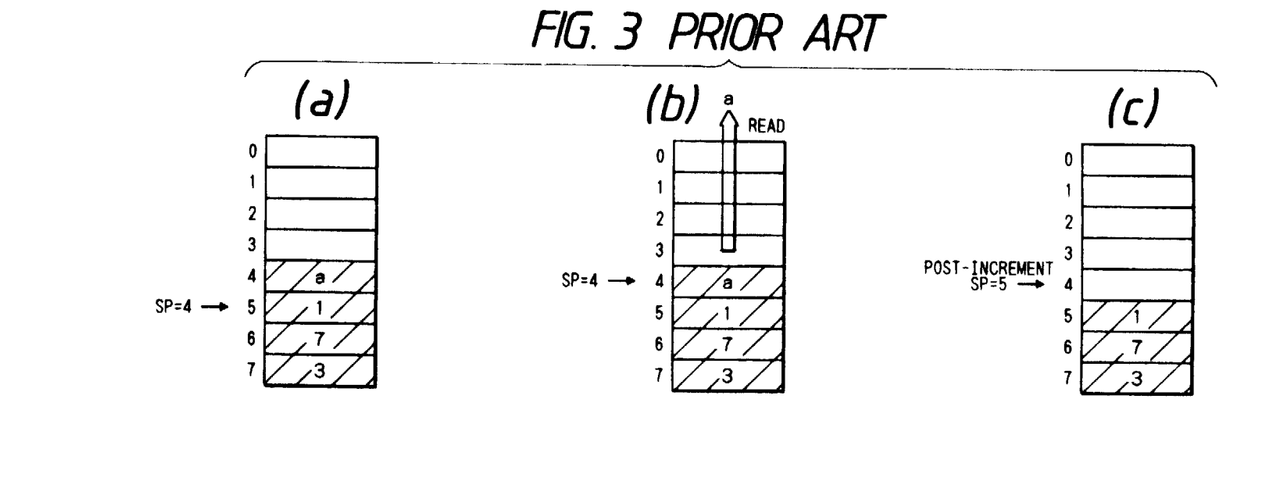

"Pop" operation of the prior art stack memory will be explained with reference to FIG. 3. "Pop" operation is a process of reading out data from the memory element array 1. In FIG. 3, the character SP denotes the state of the stack pointer 3 which indicates the address of the first of words holding data in the memory element array 1. It is now assumed that, as shown in the part (a) of FIG. 3, the current state of the stack pointer 3 is "4". This state of the stack pointer 3 represents that data are stored in the words of the memory element array 1 which have addresses of "4" to "7". The stack pointer 3 generates an address signal in response to the state "4", the address signal designating the word of the memory element array 1 which has an address of "4". The address signal is fed to the address input section 2, enabling the access to the "4"-address word of the memory element array 1 and thus allowing data "a" to be read out from the "4"-address word as shown in the part (b) of FIG. Then, the state of the stack pointer 3 is post-incremented to "5" as shown in the part (c) of FIG. 3. The post-increment is executed by a signal fed to the stack pointer 3 from the controller (not shown).

"Push" operation and "pop" operation enable the prior art stack memory to serve as a LIFO memory. As understood from the previous description, the state of the stack pointer 3 is controlled so as to represent the address of the first of words storing data.

In general, a stack memory executing such operations is used for delivering variables, storing return addresses, or saving data in registers. In the case where a stack memory is provided on a chip of a microprocessor, since the capacity of the stack memory is greatly limited, the following operations are generally required. One of the required operations is to transfer data from the stack memory to an external memory to save the data. Another required operation is to return the saved data from the external memory to the stack memory.

Figure 4:
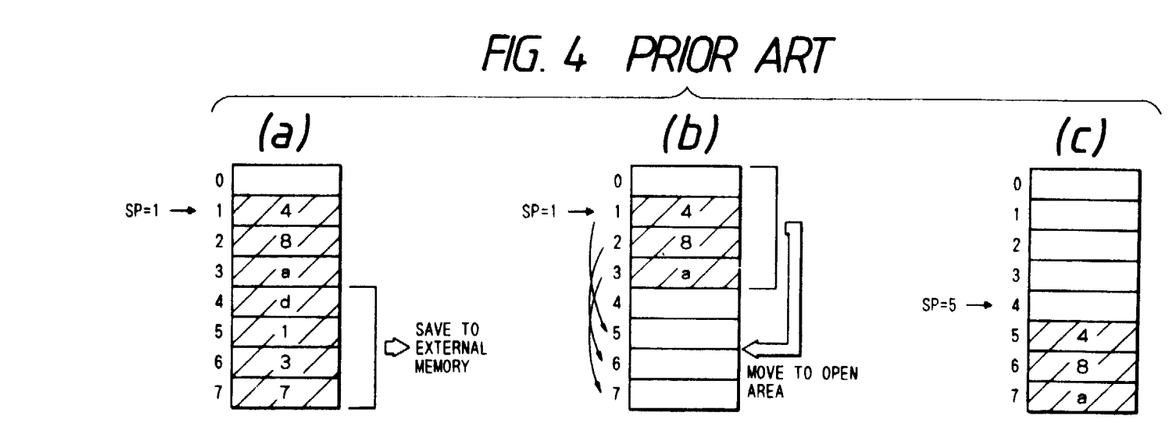

Such data-saving and data-returning operations of the prior art stack memory will be explained. Firstly, the data-saving operation will be described with reference to FIG. 4 in which the state of the stack pointer 3 is denoted by the character SP. It is now assumed that, as shown in the part (a) of FIG. 4, the current state of the stack pointer 3 is "1". This state of the stack pointer 3 represents that data are stored in the words of the memory element array 1 which have addresses of "1" to "7". Under this condition, if "push" operation is consecutively executed twice or more, there will be no memory area capable of storing data and it will be necessary to transfer (save) data from the memory element array 1 to an external memory to generate an unoccupied memory area. The generation of the unoccupied memory area is executed as follows. The state of the stack pointer 3 is set to "4", and data are read out from the "4"-address word of the memory element array 1 and are then stored into an external memory. Such operation is reiterated for sequentially reading out data from the "5"-address word, the "6"-address word, and the "7"-address word, and for storing the readout data into the external memory. In this way, the data in the "4"-address word to the "7"-address word of the memory element array 1 are saved, and these words are emptied as shown in the part (b) of FIG. 4. Then, data are moved from the "1"-address word, the "2"-address word, and the "3"-address word of the memory element array 1 to the "5"-address word, the "6"-address word, and the "7"-address word thereof respectively as shown in the parts (b) and (c) of FIG. 4. This data movement is executed by reiterating "pop" and "push" operations as follows. Firstly, "pop" operation is made on data with SP=3, and "push" operation is made on the readout data with SP=7, where SP denotes the state of the stack pointer 3. Secondly, "pop" operation is made on data with SP=2, and "push" operation is made on the readout data with SP=6. Thirdly, "pop" operation is made on data with SP=1, and "push" operation is made on the readout data with SP=5. Reiterating "pop" and "push" operations takes a considerable length of time. Finally, the state of the stack pointer 3 is incremented by a number equal to the number of the saved data. In this case, the state of the stack pointer 3 is incremented to "5" as shown in the part (c) of FIG. 4.

The data-returning operation will be described with reference to FIG. 5 in which the state of the stack pointer 3 is denoted by the character SP. It is now assumed that, as shown in the part (a) of FIG. 5, the current state of the stack pointer 3 is "7". This state of the stack pointer 3 represents that data are stored in only the word of the memory element array 1 which has an address of "7". Under this condition, if "pop" operation is consecutively executed twice or more, there will be no effective data in the memory element array 1. Therefore, in the case where the external memory stores saved data, it will be necessary to return the saved data from the external memory to the memory element array 1. To enable the return of the saved data to the memory element array 1, the "4"-address word to the "7"-address word of the memory element array 1 are emptied. Specifically, "pop" operation is made on data with SP=7 and "push" operation is made on the readout data with SP=3, so that the data are moved from the "7"-address word to the "5"-address word as shown in the parts (a) and (b) of FIG. 5. This data movement tends to take a considerable length of time. The data are transferred from the external memory, and the data are written into the "4"-address word to the "7"-address word of the memory element array 1 as shown in the part (c) of FIG. 5. The data write is executed by reiterating "push" operation with SP=7 to SP=4. Finally, the state of the stack pointer 3 is decremented by a number equal to the number of the returned data. In this case, the state of the stack pointer 3 is decremented to "3" as shown in the part (c) of FIG. 5.

As described previously, in the prior art stack memory, the movement of data in the memory element array 1 is executed for enabling data-saving operation or data-returning operation, and the data movement generally takes a considerable length of time. When the prior art stack memory is used in a microprocessor, such a long time of data movement causes a decrease in the speed of operation of the microprocessor.

DESCRIPTION OF THE PREFERRED EMBODIMENT

Figure 6:
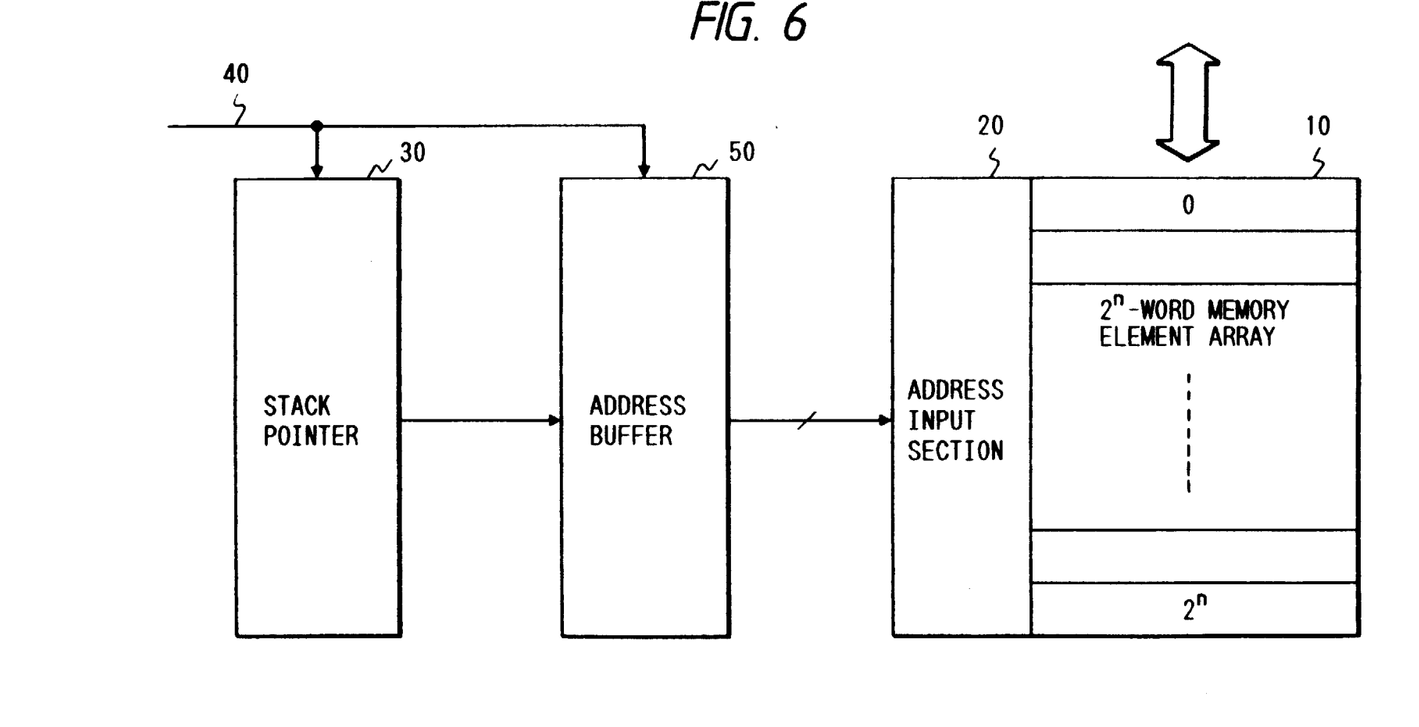
FIG. 6 is a block diagram of a stack memory according to an embodiment of this invention.

With reference to FIG. 6, a stack memory includes a memory element array 10 having a capacity of $2^n$ words where "n" denotes a given integer. The memory element array 10 is divided into segments called words. An address input section 20 is connected to the memory element array 1. A stack pointer 30 generates a first "n"-bit address signal. The stack pointer 30 receives a control signal 40 from a controller (not shown). The stack pointer 30 changes the state of the first address signal in response to the control signal 40. The first address signal is outputted from the stack pointer 30 to an address buffer 50. The address buffer 50 receives the control signal 40 from the controller (not shown). The address buffer 50 modifies the first address signal into a second "n"-bit address signal in response to the control signal 40. The second address signal is fed from the address buffer 50 to the address input section 20. The address input section 20 allows the access to one of the words of the memory element array 10 which is designated by the second address signal.

The control signal 40 has one bit, and is changeable between an active state and an inactive state. For example, the active state and the inactive state correspond to "1" and "0" respectively. When the control signal 40 assumes the inactive state, the stack pointer 30 operates similarly to the prior art stack pointer 3 of FIG. 1. When the control signal 40 assumes the inactive state, the address buffer 50 non-modifies the first address signal so that the second address signal is equal to the first address signal. Therefore, when the control signal 40 is in the inactive state, the stack memory of FIG. 6 operates similarly to the prior art stack memory of FIG. 1. As will be explained later, when the control signal 40 assumes the active state, the stack memory of FIG. 6 executes a novel operation.

Figure 7:
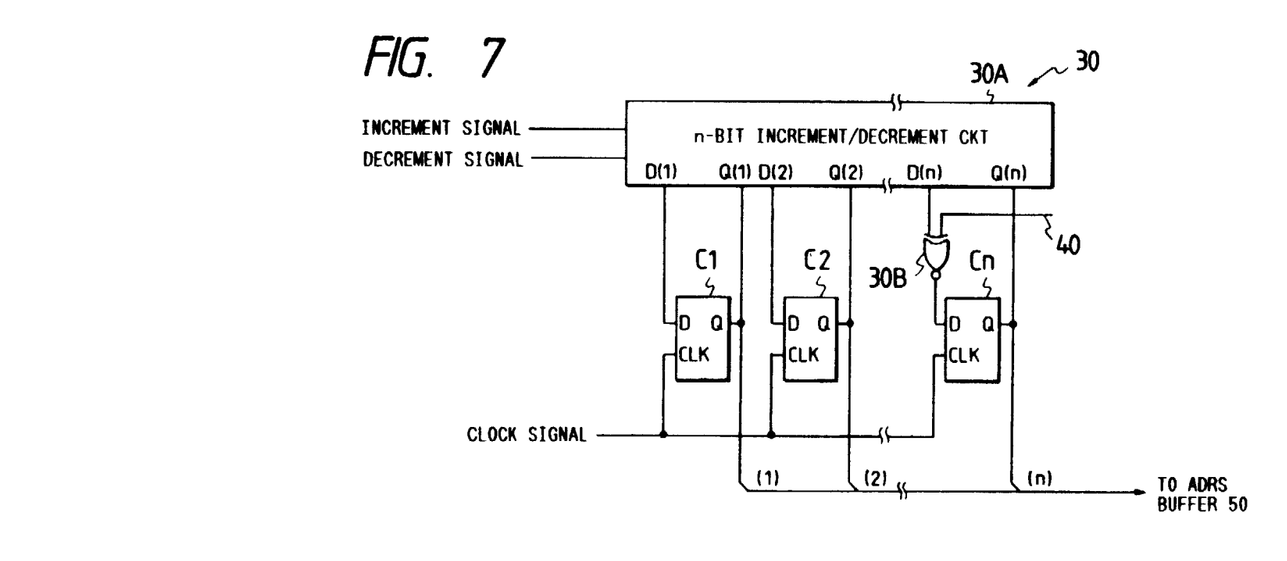
FIG. 7 is a block diagram of the stack pointer in the stack memory of FIG. 6.

As shown in FIG. 7, the stack pointer 30 includes an n-bit increment/decrement circuit 30A, an Exclusive-OR gate 30B, and a set of D flip-flops C1, C2, ..., Cn. The increment/decrement circuit 30A receives an increment signal and a decrement signal from the controller (not shown). The increment/decrement circuit 30A has a set of output terminals D(1), D(2), ..., D(n) and a set of input terminals Q(1), Q(2), ..., Q(n). When the increment/decrement circuit 30A receives the increment signal, the value of output data from the output terminals D(1), D(2), ..., D(n) is incremented by "1" and is thus made equal to "1" plus the value of input data fed to the input terminals Q(1), Q(2), ..., Q(n). When the increment/decrement circuit 30A receives the decrement signal, the value of output data from the output terminals D(1), D(2), ..., D(n) is decremented by "1" and is thus made smaller, by "1", than the value of input data fed to the input terminals Q(1), Q(2), ..., Q(n).

The input terminals Q(1), Q(2), ..., Q(n) of the increment/decrement circuit 30A are connected to the output terminals of the flip-flops C1, C2, ..., Cn respectively so that the input terminals Q(1), Q(2), ..., Q(n) of the increment/decrement circuit 30A are subjected to output data from the flip-flops C1, C2, ..., Cn. The output terminals D(1), D(2), ..., D(n−1) of the increment/decrement circuit 30A are connected to the input terminals of the flip-flops C1, C2, ..., Cn−1) respectively so that data outputted from the output terminals D(1), D(2), ..., D(n−1) of the increment/decrement circuit 30A are fed to the input terminals of the flip-flops C1, C2, ..., Cn−1. The highest-bit output terminal D(n) of the increment/decrement circuit 30A is connected to a first input terminal of the Exclusive-OR gate 30B. A second input terminal of the Exclusive-OR gate 30B receives the control signal 40. The output terminal of the Exclusive-OR gate 30B is connected to the input terminal of the flip-flop Cn. The flip-flops C1, C2, ..., Cn have clock terminals receiving a clock signal from a clock signal generator (not shown). The flip-flops C1, C2, ..., Cn−1 sample the output data from the output terminals D(1), D(2), ..., D(n−1) of the increment/decrement circuit 30A at a timing determined by the clock signal, and hold the sampled data. The flip-flop Cn samples the output data from the Exclusive-OR gate 30B at a timing determined by the clock signal, and holds the sampled data. The output terminals of the flip-flops C1, C2, ..., Cn are connected to the input terminals of the address buffer 50 so that the output data from the flip-flops C1, C2, ..., Cn are fed to the address buffer 50 as the first address signal.

When the control signal 40 is in the inactive state, the Exclusive-OR gate 30B serves as a buffer and thus the data outputted from the highest-bit output terminal D(n) of the increment/decrement circuit 30A passes through the Exclusive-OR gate 30B and reaches the input terminal of the flip-flop Cn without undergoing any logic state change. Accordingly, in this case, the data outputted from the output terminals D(1), D(2), ..., D(n) of the increment/decrement circuit 30A are sampled by the flip-flops C1, C2, ..., Cn as they are, so that the resulting output data from the flip-flops C1, C2, ..., Cn agree with the output data from the increment/decrement circuit 30A.

When the control signal 40 is in the active state, the Exclusive-OR gate 30B serves as an inverter with respect to the data outputted from the highest-bit output terminal D(n) of the increment/decrement circuit 30A so that the data outputted from the highest-bit output terminal D(n) of the increment/decrement circuit 30A is inverted by the Exclusive-OR gate 30B and the inversion of the highest bit of the output data from the increment/decrement circuit 30A is fed to the input terminal of the flip-flop Cn. Accordingly, in this case, the data outputted from the output terminals D(1), D(2), ..., D(n−1) of the increment/decrement circuit 30A are sampled by the flip-flops C1, C2, ..., Cn−1 as they are, whereas the inversion of the data outputted from the highest-bit output terminal D(n) of the increment/decrement circuit 30A is sampled by the flip-flop Cn. Thus, the resulting output data from the flip-flops C1, C2, ..., Cn−1 agree with the output data from the increment/decrement circuit 30A except the highest bit, and the output data from the flip-flop Cn equals the inversion of the highest bit of the output data from the increment/decrement circuit 30A. In this way, the highest bit of the first address signal is inverted by the active state of the control signal 40.

Figure 8:
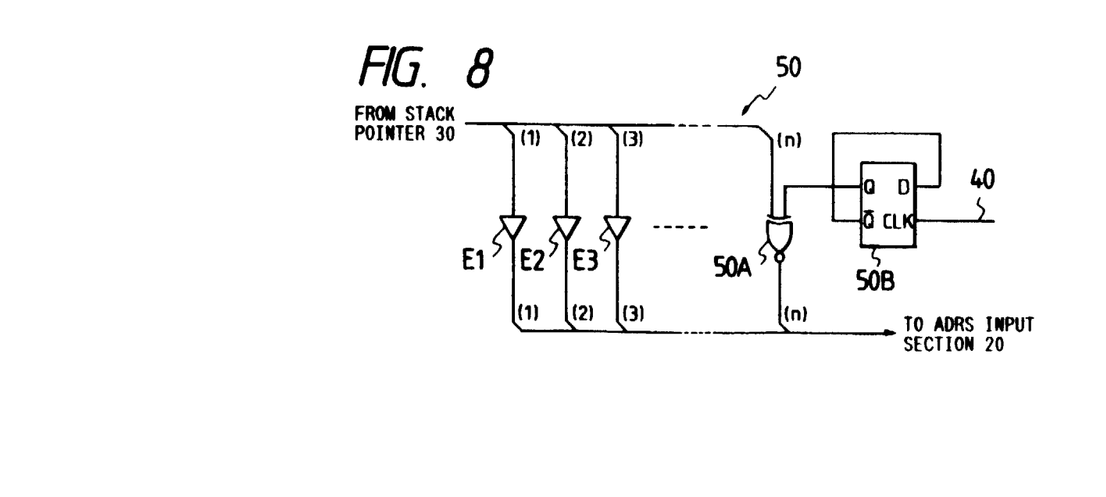
FIG. 8 is a block diagram of the address buffer in the stack memory of FIG. 6.

As shown in FIG. 8, the address buffer 50 includes an Exclusive-OR gate 50A, a D flip-flop 50B, and a set of buffer elements E1, E2, ..., En−1. The 1-st bit to the (n−1)-th bit of the output terminal of the stack pointer 30 are connected to the input terminals of the buffer elements E1, E2, ..., En−1 respectively, so that the 1-st bit to the (n−1)-th bit of the first address signal are fed to the input terminals of the buffer elements E1, E2, ..., En−1 respectively. The highest bit of the output terminal of the stack pointer 30 is connected to a first input terminal of the Exclusive-OR gate 50A so that the highest bit of the first address signal is fed to the first input terminal of the Exclusive-OR gate 50A. The flip-flop 50B has a non-inverted output terminal and an inverted output terminal. The non-inverted output terminal of the flip-flop 50B is connected to a second input terminal of the Exclusive-OR gate 50A. The inverted output terminal of the flip-flop 50B is connected to the input terminal thereof. The clock terminal of the flip-flop 50B is subjected to the control signal 40. The output terminals of the buffer elements E1, E2, ..., En−1 and the Exclusive-OR gate 50A are connected to the input terminals of the address input section 20 so that the data outputted from the buffer elements E1, E2, ..., En−1 and the Exclusive-OR gate 50A are fed to the address input section 20 as the second address signal.

During a period until the control signal 40 changes from the inactive state to the active state, the Exclusive-OR gate 50A receives a "0" signal from the flip-flop 50B so that the Exclusive-OR gate 50 serves as a buffer element with respect to the highest bit of the first address signal. Accordingly, in this case, the first address signal passes through the address buffer 50 without undergoing any logical state change, and thus the second address signal completely agrees with the first address signal.

When the control signal 40 changes from the inactive state to the active state, the flip-flop 50B is operated and thereby the Exclusive-OR gate 50A receives a "1" signal from the flip-flop 50B so that the Exclusive-OR gate 50B serves as an inverter with respect to the highest bit of the first address signal. Accordingly, in this case, the 1-st bit to the (n−1)-th bit of the first address signal pass through the address buffer 50 without undergoing any logical state change, but the highest bit of the first address signal is inverted by the address buffer 50. As a result, the second address signal agrees with the first address signal in the 1-st bit to the (n−1)-th bit, while the highest bit of the second address signal equals the inversion of the highest bit of the first address signal.

The flip-flop 50B is provided for the case where the control signal 40 has a short pulse or a limited-duration pulse while the control signal 40 remains in its active state. The flip-flop 50B may be removed and the control signal 40 may be directly applied to the second input terminal of the Exclusive-OR gate 50A in the case where the control signal 40 remains "1" during the entire period of its active state.

The description will be given of the novel operation of the stack memory of FIG. 6 in the case where the memory element array 10 has eight words and the stack pointer 30 has three bits.

It is now assumed that, as shown in the part (b) of FIG. 4, data are stored in the "1"-address word, the "2"-address word, and the "3"-address word of the memory element array 10. A consideration will now be given of the data-movement case where the data are required to be moved from the "1"-address word, the "2"-address word, and the "3"-address word to the "5"-address word, the "6"-address word, and the "7"-address word of the memory element array 10. This data-movement requirement is met by changing the control signal 40 from the inactive state to the active state. When the control signal 40 is changed to the active state, the highest bit of the output signal from the increment/decrement circuit 30A is inverted by the Exclusive-OR gate 30B so that the state of the stack pointer 30 changes from "001" to "101" in binary notation. Thus, the state of the stack pointer 30, that is, the address SP indicated by the stack pointer 30, changes from "1" to "5". At the same time, the first address signal outputted from the stack pointer 30 changes from "001" to "101". The Exclusive-OR gate 50A of the address buffer 50 inverts the highest bit of the first address signal in response to the active state of the control signal 40 so that the second address signal outputted from the address buffer 50 remains "001". Accordingly, the word of the memory element array 10 to which the access is allowed remains unchanged. In this way, the state SP of the address pointer 30 changes from "1" to "5", whereas the word of the memory element array 10 to which the access is allowed remains unchanged. The user or operator regards the change of the state SP of the address pointer 30 as the movement of the data in the memory element array 10, although the data remain stationary in the memory element array 10 in fact. This fictitious data movement is basically equivalent to a corresponding actual data movement. Thus, a process equivalent to a target data movement is completed in one machine cycle.

Figure 5:
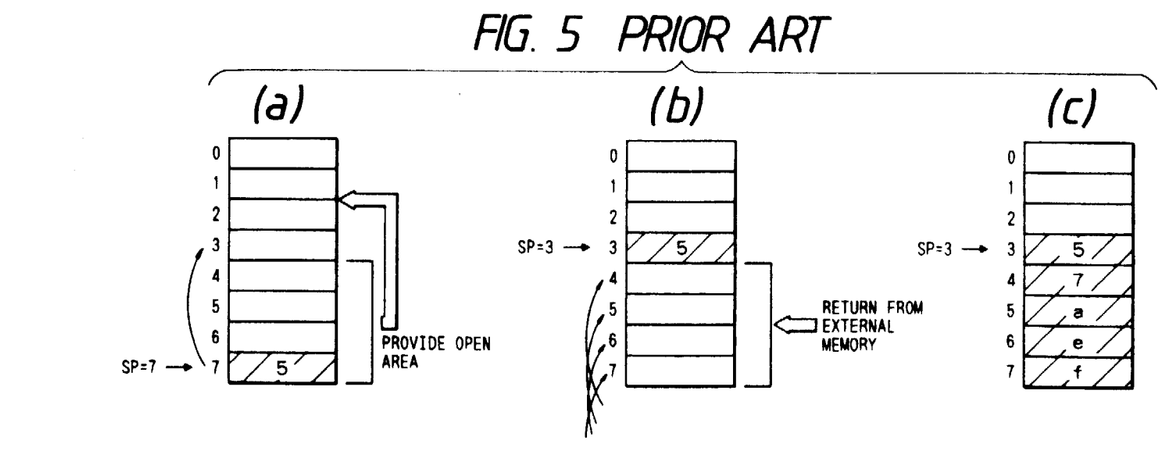

It is now assumed that, as shown in the part (a) of FIG. 5, data are stored in the "7"-address word of the memory element array 10. A consideration will now be given of the data-movement case where the data are required to be moved from the "7"-address word to the "3"-address word of the memory element array 10. This data-movement requirement is met by changing the control signal 40 from the inactive state to the active state. When the control signal 40 is changed to the active state, the highest bit of the output signal from the increment/decrement circuit 30A is inverted by the Exclusive-OR gate 30B so that the state of the stack pointer 30 changes from "111" to "011" in binary notation. Thus, the state of the stack pointer 30, that is, the address SP indicated by the stack pointer 30, changes from "7" to "3". At the same time, the first address signal outputted from the stack pointer 30 changes from "111" to "011". The Exclusive-OR 50A of the address buffer 50 inverts the highest bit of the first address signal in response to the active state of the control signal 40 so that the second address signal outputted from the address buffer 50 remains "111". Accordingly, the word of the memory element array 10 to which the access is allowed remains unchanged. In this way, the state SP of the address pointer 30 changes from "7" to "3", whereas the word of the memory element array 10 to which the access is allowed remains unchanged. The user or operator regards the change of the state SP of the address pointer 30 as the movement of the data in the memory element array 10, although the data remain stationary in the memory element array 10 in fact. This fictitious data movement is basically equivalent to a corresponding actual data movement. Thus, a process equivalent to a target data movement is completed in one machine cycle.

Such processes equivalent to actual data movements enable data-saving and data-returning operations between the stack memory and an external memory to be executed at high speeds.

What is claimed is:

1. A stack memory comprising: an address input section having "n" bits where "n" denotes a predetermined number;

a memory element array having $2^n$ words and being connected to the address input section;

a stack pointer generating a first n bit address signal having "n" bits, wherein an n-th bit of the first address signal is inverted in response to a control signal; and an address buffer connected between the stack pointer and the address input section, the address buffer generating a second address signal of n bits from the first address signal and outputting the second address signal to the address input section, wherein bit values of the bits of the second address signal are equal to bit values of the bits of the first address signal except for an n-th bit, the n-th bit of the first address signal being inverted again in response to the control signal and supplied as the n-th bit of the second address signal.

2. A stack memory comprising:

a memory element array having a plurality of words;

means for generating a first address signal;

means for generating a second address signal from the first address signal;

means for accessing one of the words of the memory element array in response to the second address signal;

means for changing the first address signal in response to a control signal; and means responsive to the control signal for providing the second address signal corresponding to an unchanged first address signal by compensating for the changing of the first address signal by the means for changing the first address signals, operation of said means for providing the second address signal being independent of any change in the first address signal effected by said means for changing the first address signal.

3. A stack memory comprising:
a memory element array having a plurality of words;
means for generating a first address signal;
means for generating a second address signal from the first address signal;
means for allowing an access to one of the words of the memory element array in response to the second address signal;
means for equalizing the first address signal and the second address signal in the absence of an active control signal;
means for changing the first address signal in response to the active control signal; and
means responsive to the active control signal for providing the second address signal corresponding to an unchanged first address signal by compensating for the changing of the first address signal by the means for changing the first address signal, operation of said means for providing the second address signal being independent of any change in the first address signal effected by said means for changing the first address signal.

4. The stack memory of claim 3 wherein the changing means comprises means for inverting a value of a highest bit of the first address signal in response to the active control signal, and wherein the means for providing the second address signal corresponding to an unchanged first address signal comprises means for inverting again the inverted value of said highest bit of the first address signal in response to the active control signal.

5. A stack memory comprising:
a memory responsive to an n-bit address signal for accessing memory cells of said memory;
stack pointer means for supplying an n-bit stack pointer signal and including means for selectively inverting one bit in response to a control signal; and
address buffer means for receiving said n-bit stack pointer signal and, in response to said control signal, for selectively inverting the inverted said one bit of said n-bit stack pointer signal to make said n-bit stack pointer signal into said n-bit address signal and supplying said n-bit address signal to said memory.

6. The stack memory according to claim 5, wherein said means for selectively inverting one bit includes a first exclusive NOR gate means receiving said control signal and said one bit, and
said address means for selectively inverting the inverted said one bit includes non-inverting means for not inverting the other bits of the n-bit stack pointer signal and a second exclusive NOR gate means receiving said control signal and the inverted said one bit for selectively inverting said one bit responsive to said control signal, said non-inverting means and said second exclusive NOR gate means supplying said n-bit address signal to said memory.

7. A stack memory comprising:
a memory including a plurality of memory cells, said memory responsive to a memory address signal for accessing said memory cells;
stack pointer means for supplying an n-bit stack pointer address signal; and
address buffer means responsive to a control signal for selectively inverting one bit of said stack pointer address signal to make said stack pointer address signal into said memory address signal, and for supplying said memory address signal to said memory whereby said n-bits of said memory address signal selectively correspond to (i) said stack pointer address signal with no bit values inverted, or (ii) said stack pointer address signal with only one bit value inverted.

* * * * *